US010142215B2

United States Patent
Deschênes et al.

(10) Patent No.: US 10,142,215 B2
(45) Date of Patent: Nov. 27, 2018

(54) MONITORING NETWORK PERFORMANCE OF ENCRYPTED COMMUNICATIONS

(71) Applicant: BMC SOFTWARE, INC., Houston, TX (US)

(72) Inventors: Danny Deschênes, Montreal (CA); Joe Pei-Wen Hsy, Menlo Park, CA (US); Pierre Larose, St-Basile-Le-Grand (CA)

(73) Assignee: BladeLogic, Inc., Houston, TX (US)

( * ) Notice: Subject to any disclaimer, the term of this patent is extended or adjusted under 35 U.S.C. 154(b) by 165 days.

(21) Appl. No.: 14/947,569

(22) Filed: Nov. 20, 2015

(65) Prior Publication Data

US 2016/0119215 A1    Apr. 28, 2016

Related U.S. Application Data

(63) Continuation of application No. 13/432,847, filed on Mar. 28, 2012, now Pat. No. 9,197,606.

(51) Int. Cl.
| | |
|---|---|
| *H04L 9/32* | (2006.01) |
| *H04L 12/26* | (2006.01) |
| *H04L 29/06* | (2006.01) |
| *G06F 15/16* | (2006.01) |

(52) U.S. Cl.
CPC .......... *H04L 43/12* (2013.01); *H04L 63/0428* (2013.01)

(58) Field of Classification Search
CPC ............................ H04L 43/12; H04L 63/0428
USPC .......................................... 713/168; 709/224
See application file for complete search history.

(56) References Cited

U.S. PATENT DOCUMENTS

| | | | |
|---|---|---|---|
| 5,521,907 A | 5/1996 | Ennis et al. | |
| 5,781,449 A | 7/1998 | Rosborough | |
| 5,838,920 A | 11/1998 | Rosborough | |
| 5,870,557 A | 2/1999 | Bellovin et al. | |
| 6,363,477 B1 * | 3/2002 | Fletcher ............... | H04L 43/106 709/223 |

(Continued)

FOREIGN PATENT DOCUMENTS

| | | |
|---|---|---|
| WO | 03038622 A1 | 5/2003 |
| WO | 03084134 A1 | 10/2003 |
| WO | 2013148472 A1 | 10/2013 |

OTHER PUBLICATIONS

Non-Final Office Action for U.S. Appl. No. 13/174,464 dated May 23, 2013, 12 pages.

(Continued)

*Primary Examiner* — Morshed Mehedi
*Assistant Examiner* — Abdullah Almamun
(74) *Attorney, Agent, or Firm* — Brake Hughes Bellermann LLP

(57) ABSTRACT

According to one general aspect, a method of using a first probing device may include monitoring one or more encrypted communications sessions between a first computing device and a second computing device. In some implementations of the method, each encrypted communications session includes transmitting a plurality of encrypted data objects between the first and second computing devices. The method may include deriving, by the first probing device, timing information regarding an encrypted communications session. The method may also include transmitting, from the first probing device to a second probing device, the derived timing information.

20 Claims, 6 Drawing Sheets

(56) References Cited

U.S. PATENT DOCUMENTS

| | | |
|---|---|---|
| 6,446,200 B1 | 9/2002 | Ball et al. |
| 6,457,143 B1 | 9/2002 | Yue |
| 6,801,940 B1 | 10/2004 | Moran et al. |
| 6,831,890 B1 * | 12/2004 | Goldsack ................ H04L 43/00 370/229 |
| 7,506,368 B1 | 3/2009 | Kersey et al. |
| 7,742,406 B1 * | 6/2010 | Muppala ............. H04L 41/5022 370/230 |
| 7,778,194 B1 | 8/2010 | Yung |
| 7,953,973 B2 | 5/2011 | Beam et al. |
| 7,962,606 B2 | 6/2011 | Barron et al. |
| 8,005,011 B2 | 8/2011 | Yang |
| 8,023,419 B2 | 9/2011 | Oran |
| 8,260,953 B2 | 9/2012 | Audenaert et al. |
| 8,266,276 B1 | 9/2012 | Vasudeva |
| 8,374,185 B2 | 2/2013 | Yang et al. |
| 8,539,221 B2 | 9/2013 | Tremblay et al. |
| 8,688,982 B2 | 4/2014 | Gagnon et al. |
| 8,694,779 B2 | 4/2014 | Gagnon et al. |
| 9,100,320 B2 | 8/2015 | Hsy et al. |
| 9,197,606 B2 | 11/2015 | Deschenes et al. |
| 9,331,920 B2 * | 5/2016 | Nedeltchev ............. H04L 43/08 |
| 2002/0199098 A1 | 12/2002 | Davis |
| 2003/0043844 A1 | 3/2003 | Heller |
| 2003/0145079 A1 | 7/2003 | Breese et al. |
| 2004/0168050 A1 | 8/2004 | Desrochers et al. |
| 2004/0221034 A1 | 11/2004 | Kausik et al. |
| 2005/0050316 A1 | 3/2005 | Peles |
| 2005/0050362 A1 | 3/2005 | Peles |
| 2005/0099960 A1 * | 5/2005 | Boss ................... H04L 41/5009 370/252 |
| 2005/0149718 A1 | 7/2005 | Berlin |
| 2006/0211416 A1 | 9/2006 | Snyder et al. |
| 2006/0259542 A1 * | 11/2006 | Wu ......................... H04L 43/12 709/202 |
| 2007/0028094 A1 | 2/2007 | Sugiyama |
| 2007/0258468 A1 | 11/2007 | Bennett |
| 2008/0279097 A1 | 11/2008 | Campion et al. |
| 2009/0245122 A1 * | 10/2009 | Maiocco .................. H04L 43/08 370/252 |
| 2010/0088404 A1 | 4/2010 | Mani et al. |
| 2010/0131946 A1 * | 5/2010 | Degaonkar ......... G06F 11/2025 718/1 |
| 2010/0211675 A1 | 8/2010 | Ainali et al. |
| 2010/0303003 A1 | 12/2010 | Park et al. |
| 2011/0099620 A1 | 4/2011 | Stavrou et al. |
| 2011/0119375 A1 | 5/2011 | Beeco et al. |
| 2011/0153810 A1 * | 6/2011 | Raja ................... H04L 67/1029 709/224 |
| 2012/0042064 A1 | 2/2012 | Gagnon et al. |
| 2012/0047251 A1 * | 2/2012 | Baumback .......... G06F 11/3409 709/224 |
| 2012/0113270 A1 * | 5/2012 | Spracklen ............ H04N 17/004 348/194 |
| 2013/0173778 A1 | 7/2013 | Hsy et al. |
| 2013/0227134 A1 * | 8/2013 | West, III ................. H04L 43/10 709/224 |
| 2013/0262655 A1 | 10/2013 | Deschênes et al. |

OTHER PUBLICATIONS

Notice of Allowance for U.S. Appl. No. 13/174,473, dated Nov. 15, 2013, 12 pages.

Non-Final Office Action for U.S. Appl. No. 13/174,473, dated Jul. 11, 2013, 14 pages.

International Search Report and Written Opinion for International Application Serial No. PCTUS1333361, dated Jun. 21, 2013, 14 pages.

European Search Report for European Patent Application No. 12199311.7, dated Mar. 21, 2013, 5 pages.

Office Action received for European Patent Application No. 12199311.7, dated Apr. 4, 2013, 6 pages.

Notice of Allowance for U.S. Appl. No. 13/174,464, dated Nov. 13, 2013, 15 pages.

Non-Final Office Action for U.S. Appl. No. 13/341,144, dated Jun. 6, 2014, 15 Pages.

Notice of Allowance for U.S. Appl. No. 13/341,144, dated Mar. 30, 2015, 21 pages.

Non-Final Office Action for U.S. Appl. No. 13/432,847, dated Apr. 6, 2015, 14 pages.

Notice of Allowance for U.S. Appl. No. 13/432,847, dated Jul. 21, 2015, 9 Pages.

Balachandra, et al., "Cloud Security Issues", Services Computing, 2009. SCC '09. IEEE International Conference on, IEEE, Piscataway, NJ, USA, 21, Sep. 21, 2009.

Office Action for European Application No. EP13717364.7, dated Feb. 16, 2016, 4 pages.

Office Action for European Application No. EP13717364.7, dated Nov. 23, 2015, 3 pages.

Vincent, et al., "Low level Metrics to High level SLAs—LoM2HiS framework: Bridging the gap between monitored metrics and SLA parameters in cloud environments", High Performance Computing and Simulation (HPCS), 2010 International Conference on, IEEE, Piscataway, NJ, USA,, Jun. 28, 2010.

Wei, et al., "Measuring Client-Perceived Pageview Response Time of Internet Services", Wei, Jianbin et al, "Measuring Client-Perceived Pageview Response Time of Internet Services", IEEE Transactions on Parallel and Distributed Systems, vol. 22, No. 5, May 2011, pp. 773-785., May 2011, pp. 773-785.

Extended European Search Report for European Application 17159345.2, dated May 22, 2017, 9 pages.

First Examination Report for Australian Application 2012265602, dated Jun. 22, 2017, 3 pages.

First Examination Report for Australian Application No. 2013240064, dated Jun. 15, 2016, 3 pages.

Notice of Acceptance for Australian Application No. 2013240064, dated Jun. 2, 2017, 3 pages.

* cited by examiner

300

400

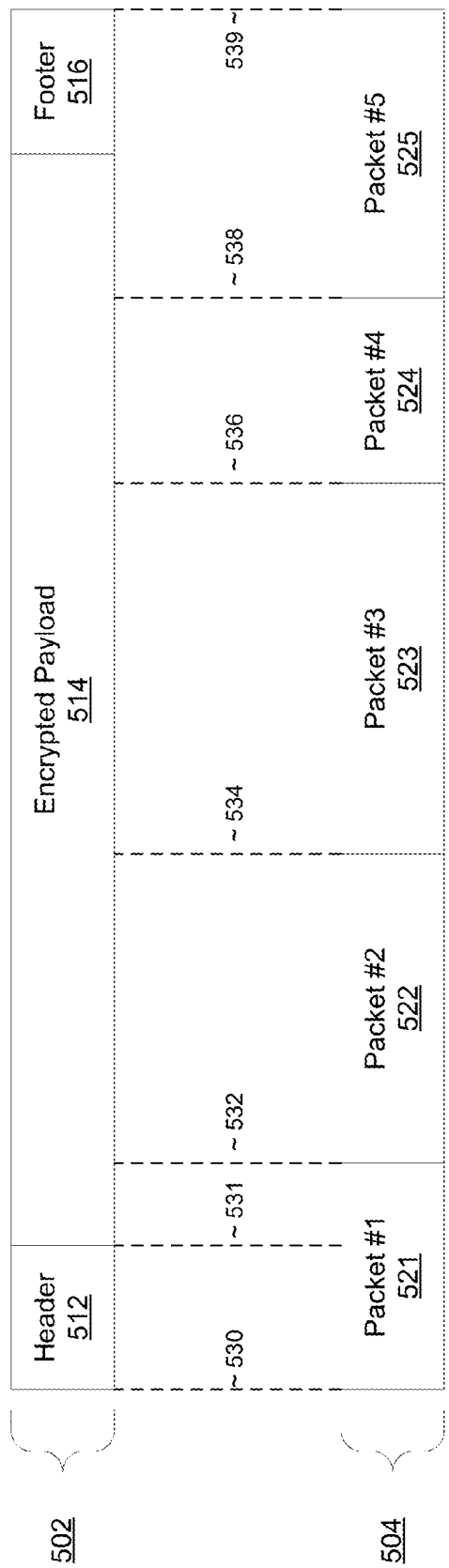

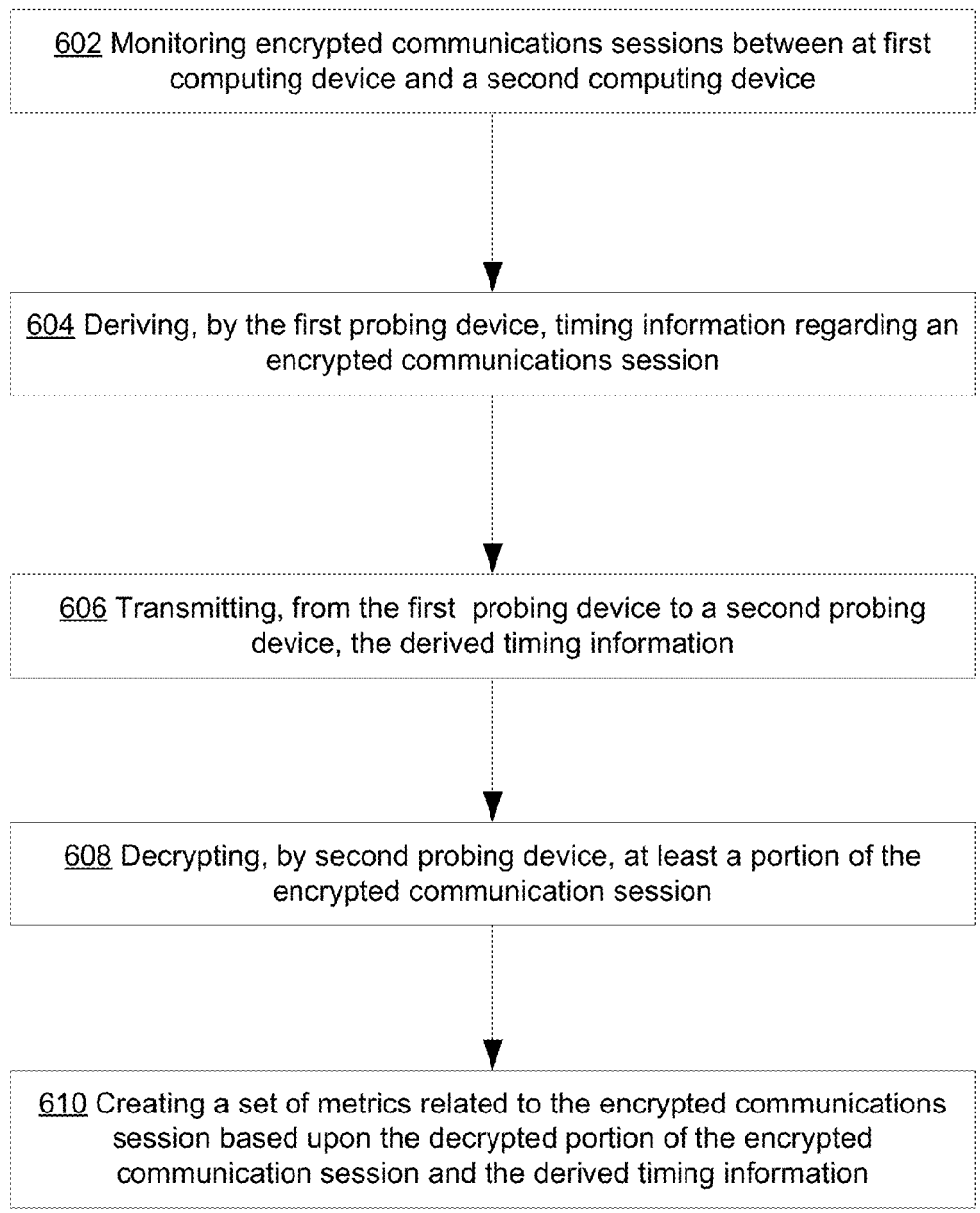

MONITORING NETWORK PERFORMANCE OF ENCRYPTED COMMUNICATIONS

RELATED APPLICATION

This application is a continuation of U.S. application Ser. No. 13/432,847, filed Mar. 28, 2012, entitled "Monitoring Network Performance of Encrypted Communications", which is hereby incorporated by reference in its entirety.

TECHNICAL FIELD

This description relates to network performance, and more specifically to monitoring and analyzing the performance of communication between two network devices.

BACKGROUND

In a traditional software model, corporate information technology (IT) groups purchase software, deploy the software, and manage the software in its own data center. In such a model, the IT group is responsible for the performance and availability of the applications or purchased software. Traditionally, such IT groups use tools for monitoring the software applications in order to ensure consistent performance and availability.

Software as a service (SaaS), sometimes referred to as "on-demand software" or "Cloud software", is typically a software delivery model in which software and its associated data are hosted centrally (typically in the Internet or cloud) and are typically accessed by users from a computing device (e.g., desktop, laptop, netbook, tablet, smartphone, etc.) using a web browser over the Internet. SaaS has become a common delivery model for many business applications, including accounting, collaboration, customer relationship management (CRM), enterprise resource planning (ERP), invoicing, human resource management (HRM), content management (CM) and service desk management, etc. SaaS has been incorporated into the strategy of many leading enterprise software companies.

However, in the SaaS services model, in which the software is often provided as a service by a third party, end-user organizations frequently subscribe directly with a software provider. As such, an end-user generally directly contacts the SaaS provider to provide the software with a certain level of performance or availability.

However, often the end-users have neither the skills nor the economic resources to actively track such SaaS service levels. Nor would they generally have the tools to track such levels even if they wanted to. Frequently, there are no consistent service level agreements (SLAs) from a corporate perspective and even where there are SLAs, there are few tools to track performance let alone enforce service levels. As such, corporations frequently can no longer count on their IT groups to be responsible for the operations and management of mission critical applications. Often the IT group is reduced to merely supporting network and desktop access to SaaS providers, and not the performance of the SaaS applications themselves. Frequently, SaaS providers are now responsible for the application's performance and the corporate IT groups may not even have a direct relationship with the SaaS provider.

SUMMARY

According to one general aspect, a method of using a first probing device may include monitoring one or more encrypted communications sessions between a first computing device and a second computing device. In some implementations of the method, each encrypted communications session includes transmitting a plurality of encrypted data objects between the first and second computing devices. The method may include deriving, by the first probing device, timing information regarding an encrypted communications session. The method may also include transmitting, from the first probing device to a second probing device, the derived timing information.

According to another general aspect, a system may include a first and a second network tap points and a client-side probing device. The first network tap point may be configured to duplicate, in a non-intrusive manner, at least part of an encrypted network communication transmitted to and from an access point device that forms the boundary between a first network and a second network. The second network tap point may be configured to duplicate, in a non-intrusive manner, at least part of an encrypted network communication transmitted to and from a server computing device placed within, in a network topology sense, the second network. The client-side probing device may be configured to monitor encrypted communications sessions between the server computing device and the client computing device, wherein each encrypted communications session includes transmitting a plurality of encrypted data objects between the server and client computing devices. The client-side probing device may be configured to derive timing information regarding an encrypted communications session based upon one or more received encrypted data objects included by the encrypted communications session. The client-side probing device may be configured to transmit, to a server-side probing device, the derived timing information.

According to another general aspect, a computer program product for managing a network may be tangibly and non-transitorily embodied on a computer-readable medium. The computer program may include executable code that, when executed, is configured to cause an apparatus to monitor encrypted communications sessions between a first computing device and a second computing device, wherein each encrypted communications session includes transmitting a plurality of encrypted data objects between the first and second computing devices. The executable code cause the apparatus to derive, by the apparatus, timing information regarding an encrypted communications session based upon one or more received encrypted data objects included by the encrypted communications session. The executable code may cause the apparatus to transmit, from the apparatus to a second apparatus, the derived timing information.

The details of one or more implementations are set forth in the accompanying drawings and the description below. Other features will be apparent from the description and drawings, and from the claims.

BRIEF DESCRIPTION OF THE DRAWINGS

FIG. 5 is a timing diagram of an example embodiment of a system in accordance with the disclosed subject matter.

FIG. 6 is a flowchart of an example embodiment of a technique in accordance with the disclosed subject matter.

Like reference symbols in the various drawings indicate like elements.

DETAILED DESCRIPTION

Figure 1:
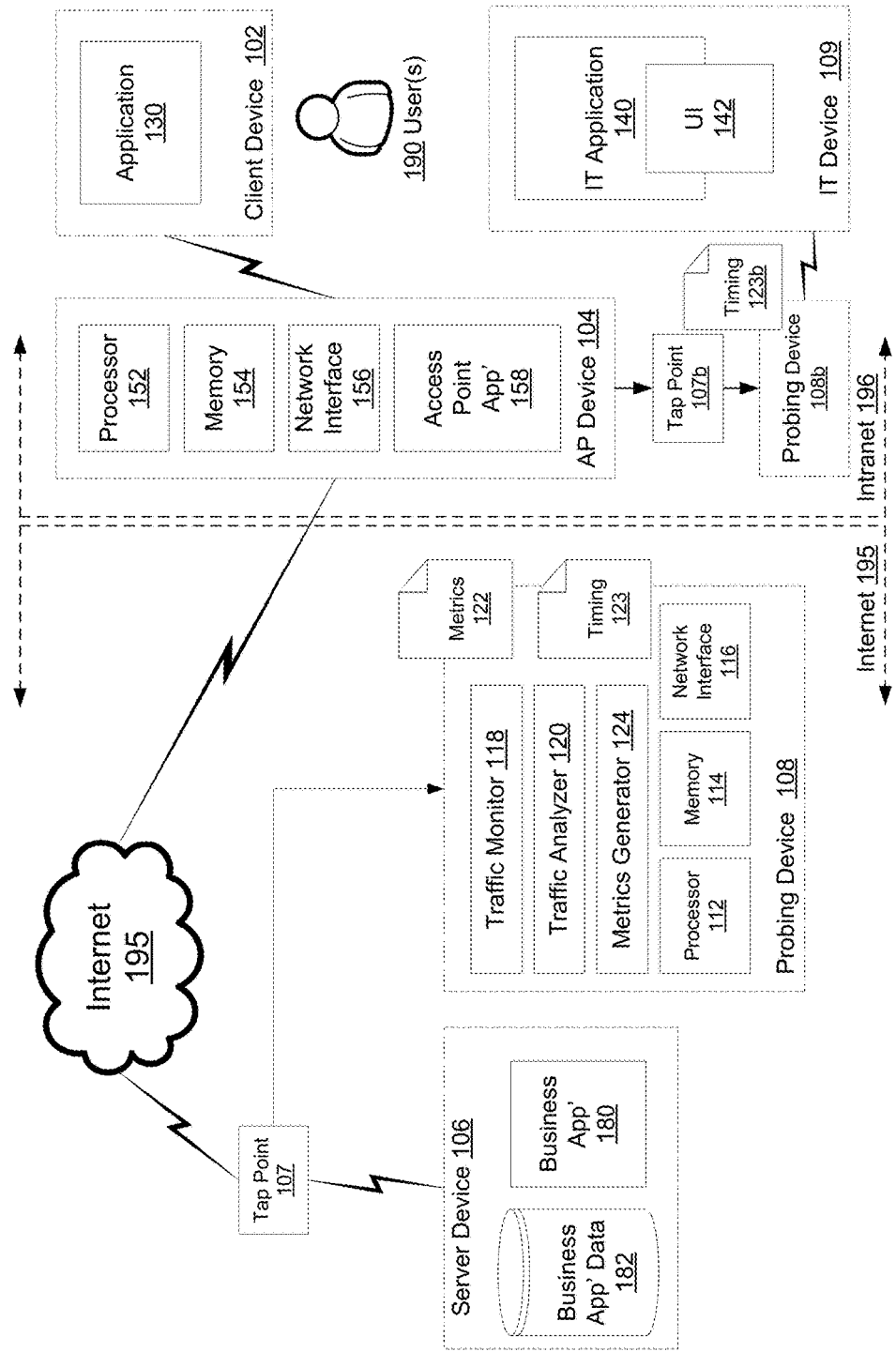
FIG. 1 is a block diagram of an example embodiment of a system in accordance with the disclosed subject matter.

FIG. 1 is a block diagram of an example embodiment of a system 100 in accordance with the disclosed subject matter. In various embodiments, the system 100 may include two or more communications networks. In the illustrated embodiment, the system 100 may include an intranet 196 and an internet 195. However, it is understood that the above is merely one illustrative example to which the disclosed subject matter is not limited. Further, it is understood that, while two networks or network segments 195 and 106 are illustrated, the disclosed subject matter is not limited to any number of such network or network segments.

In various embodiments, the system 100 may include a first communications network (e.g., intranet 196, etc.) that includes a client computing device 102. Typically, this first communications network 196 may be under the control of a single IT group or business unit. In various embodiments, the system 100 may include a second communications network (e.g., internet 195, etc.) that includes, at least from the point of view of the client computing device 102, the server computing device 106. Typically, this second communications network 195 may not be under the control of the IT group or business unit. It is understood that the above are merely a few illustrative examples to which the disclosed subject matter is not limited.

In various embodiments, the system 100 may include a server computing device or server 106 configured to provide a service (e.g., a web server, a SaaS application, etc.). In one embodiment, the server computing device 106 may include a processor, memory, and network interface (not shown, but analogous to those of device 104 or 108). In the illustrated embodiment, the server computing device 106 may provide and include the business application 180 and the business application data 182. In various embodiments, this business application 180 may include a SaaS application (e.g., a CRM, an ERP, a HRM, a CM, etc.). It is understood that, while one server 106 is illustrated, the disclosed subject matter is not limited to any number of such devices.

In one embodiment, the computing device illustrated as server 106 may include any peer device (e.g., client or server, etc.) that communicates, at least partially, over via an encrypted protocol (e.g., Secure Sockets Layer (SSL) protocol, Transport Layer Security (TLS) protocol, etc.). Further, while the communication between the devices 106 and 102 are generally described as involving the Hypertext Transfer Protocol (HTTP) and/or the HTTP Secure (HTTPS) protocol, it is understood that the above are merely a few illustrative examples to which the disclosed subject matter is not limited. Finally, it is understood that the devices 102, 104, 106, 108, 108b, and 109 may include instantiations of such devices included in respective virtual or modular environments (e.g., a blade server system, virtual machines, etc.).

In various embodiments, the system 100 may include a client computing device or client 102 configured to consume or make use of the service (e.g., business application 180, SaaS application, etc.) provided by the server 106. In one embodiment, the client 102 may include a processor, memory, and network interface (not shown, but analogous to those of device 104 or 108). In various embodiments, the client 102 may include or execute an application 130 (e.g., a web browser, etc.) that accesses or displays the service or application 180 provided by the server 106. In some embodiments, the client 102 may be controlled or used by a user 190. In various embodiments, the client 102 may include a traditional computer (e.g., a desktop, laptop, netbook, etc.) or a non-traditional computing device (e.g., smartphone, tablet, thin client, computer terminal, etc.). It is understood that while only one client 102 is illustrated the disclosed subject matter is not limited to any particular number of client devices 102.

In various embodiments, the system 100 may include an access point (AP) device or intranet/internet AP device 104. In such an embodiment, the AP device 104 may be configured to separate the first and second networks (e.g., intranet 196 and internet 195, etc.). In various embodiments, the AP device 104 may include a router, a firewall, a proxy server, etc. or a combination thereof. It is understood that the above are merely a few illustrative examples to which the disclosed subject matter is not limited.

In various embodiments, the AP device 104 may include a processor 152 configured to execute a stream or machine executable instructions (e.g., operating system, application 158, etc.). The AP device 104 may include a memory 154 configured to store data and/or instructions. In various embodiments, the memory 154 may include volatile memory, non-volatile memory, or a combination thereof. The memory 154 or portions thereof may be configured to store data in a temporary fashion (e.g., Random Access Memory (RAM), etc.) as part of the execution of instructions by the processor 152. The memory 154 or portions thereof may be configured to store data in a semi-permanent or long-term fashion (e.g., a hard drive, solid-state memory, flash memory, optical storage, etc.).

In various embodiments, the AP device 104 may include one or more network interfaces 156 configured to communicate with other devices (e.g., server 106, client 102, etc.) via a communications network. In various embodiments, this communications network may employ wired (e.g., Ethernet, Fibre Channel, etc.) or wireless (e.g., Wi-Fi, cellular, etc.) protocols or standards or a combination thereof In one embodiment, the AP device 104 may include a device or AP application 158 that acts as an intermediary between the client 102 and the server 106. In the illustrated embodiment, which illustrates the AP device 104 as a proxy server, the client 102 may make a request to the AP device 104 to access the server 106 on behalf of the client 102. In such an embodiment, the AP device 104 may then forward (often repackaging or encapsulating) the communication from the client 102 to the server 106. Likewise, the server 106 may contact the AP device 104 with information or data that is to be forwarded to the client 102.

In such an embodiment, communication between the server 106 and the client 102 may take place in two parts. A client-side portion or part may occur between the client 102 and the AP device 104 via the intranet 196. A server-side portion may occur between the server 106 and the AP device 104 via the internet 195. In combination, these client and server side portions may constitute the communication between the two devices 102 and 106 across the two networks 195 and 196.

Often, one or both of these client-side and server-side portions may be encrypted. In such an embodiment, each of the respective encrypted portions of the network communication may include their respective encryption keys or security credentials.

For example, communication between the server 106 and the client 106 may be encrypted via the Hypertext Transfer Protocol (HTTP) Secure (HTTPS) protocol which makes use of the Secure Sockets Layer (SSL) and/or Transport Layer Security (TLS) protocols to provide encrypted communication and secure identification between two networked devices. It is understood that the above is merely one illustrative example to which the disclosed subject matter is not limited.

In the illustrated embodiment, an IT department or other entity may wish to monitor and analyze the network communication between the client 102 and the server 106. In order to do this, the IT department or other entity may place a network tap or probe point 107 on a network (e.g., 196, etc.). In this context, a "network tap point" or "network probe point" includes a substantially non-invasive means of viewing or monitoring network communication through the portion of the network where the network tap point 107 has been placed. In the illustrated embodiment, the network tap point 107 is placed such that any network communication transmitted or received by the server 106 is monitored or viewed.

However, placing a single network tap point 107 on the internet 195 side of the AP device 104 may not be a preferred embodiment. In various embodiments, this may be because a single tap point close to the server (e.g., tap point 107, etc.) may not provide visibility as to which network segment of the potential multiple segments between 102 and 106 could be the bottleneck segment. It is understood that the above is merely one illustrative example to which the disclosed subject matter is not limited. In various embodiments, the more network segments there are the more tapping points may be desired.

For example, in the illustrated embodiment, a second tap or probe point 107b may be placed such that any network communication traversing the AP Device 104 may be monitored or viewed. In various embodiments, additional tap points or a plurality of taps points may be added throughout the system. For example a third or fourth tap points (not shown) may be added at strategic or desirable points within the system to monitor or obtain performance metrics for additional network segments (e.g., between client 102 and AP device 104, etc.). In various embodiments, the tap point 107b and/or any additional tap points (not shown) may be similar or analogous to the tap point 107 described herein. Another embodiment is shown and discussed in reference to FIG. 2, as described below. It is understood that the above are merely an illustrative example to which the disclosed subject matter is not limited.

In various embodiments, the network tap or probe point 107 may include a physical connection that splits or duplicates an incoming network signal and therefore any network communication transmitted via that network signal into two or more outgoing network signals. In such an embodiment, one of the outgoing network signals may be transmitted to its normal destination (e.g., AP device 104 or client device 102, etc.) and the second outgoing network signal may be transmitted to a tap, snooping, or listening device (e.g., probing device 108, etc.). In such an embodiment, any delay added to the network communications signal may be minimal or substantially unnoticeable and the network signal may be unaltered or unprocessed. As such, the network tap point 107 may perform in a substantially non-intrusive manner.

In various embodiments, the network tap points 107 and 107b may be placed near, in a network topology sense, to the server device 106 or, respectively, the AP device 104 so as to capture or duplicate network communication passing between the server device 106 and the client device 102 through the AP device 104 or across the boundary between the two networks (e.g., an internet 195/intranet 196 boundary, etc.). In the illustrated embodiment, the network tap points 107 and 107b may provide a view of the server 106/client 102 network communication from a point of view both closer to the client 102 or the AP device 104 (tap point 107b) and the server 106 (tap point 107). It is understood that the above is merely one illustrative example to which the disclosed subject matter is not limited.

In one embodiment, the probing device 108 may include a processor 112, memory 114, and network interface 116, analogous to those described above. As described above, in various embodiments, the memory 114 may include volatile storage (e.g., random access memory etc.), non-volatile storage (e.g., a hard drive, a solid-state drive, etc.), or a combination thereof. In some embodiments, the probing device 108 may include the network tap or probe point 107.

In various embodiments, the probing device 108 may be configured to monitor and analyze both encrypted and/or unencrypted network communication. In such an embodiment, the probing device 108 may generate a set of metrics 122 regarding the performance of the network communication between the client 102 and the server 106. These metrics 122 may be transmitted or displayed within a user interface (UI) 142 of an IT application 140 that is executed by an IT computing device 109. In various embodiments, the IT computing device 109 may include a traditional computer (e.g., a desktop, laptop, netbook, etc.) or a non-traditional computing device (e.g., smartphone, tablet, thin client, computer terminal, etc.).

In the illustrated embodiment, the probing device 108 may be configured to receive or monitor traffic captured by tap point 107 on the server-side. Conversely, probing device 108b may be configured to receive or monitor traffic captured by tap point 107b on the client-side. In various embodiments, probing device 108b may include elements and perform some or all functions similarly to probing device 108, as described herein. In another embodiment, such as that discussed in reference to FIG. 2, the probing devices 108 and 108b may perform similar but different functions or include different elements. It is understood that the above is merely one illustrative example to which the disclosed subject matter is not limited.

In one embodiment, the probing device 108 may include a traffic monitor 118 configured to monitor network communication captured or duplicated by the network tap point 107. In various embodiments, this network communication may include encrypted network communication between the client 102 and the server 106. In the illustrated embodiment, the encrypted communication may include a portion of the client/server communication that occurs between the client 102 and the AP device 104. In a more preferred embodiment (e.g., the system 200 of FIG. 2), the tap point 107 may be placed to capture encrypted communication between the server 106 and the client device 102. It is understood that the above are merely a few illustrative examples to which the disclosed subject matter is not limited.

In some embodiments, as described below in reference to FIG. 2, the traffic monitor 118 of servers-ide probing device 108 may be configured to decrypt all or part of the network communication captured by one or more network tap points. In other embodiments, as described below in reference to FIG. 2, the probing device 108 may be configured to decrypt all or part of the network communication captured by the network tap point 107 and may monitor and analyze such traffic.

Conversely, client-side probing device 108b may not be configured to decrypt any or part of the network communication captured by the network tap point 107b, but may still monitor and analyze such traffic. In various embodiments, the probing device 108b may be prevented from being able to decrypt the network communications because a private encryption key associated with the server device 106 (illustrated in FIG. 2) remains within the server device for security reasons.

In such an embodiment, the probing device 108 can be configured to decrypt the network communication because it is within the domain (e.g., secure data center of the server device 106, etc.) and may be trusted with the private encryption key, whereas client-side probing device 108b (and other tapping points, as described below) are typically without or exterior to the domain (e.g., outside the secure data center, etc.)

and do not have access to the private encryption key that is used to decrypt the network communication. This ability to at least partially decrypt encrypted network communication traffic is contrasted with traditional network communication monitoring schemes that generally discard or do not monitor encrypted network communication as the analyzer 120 or other portions of the probing devices 108 and/or 108b are incapable of processing encrypted network communication.

In one embodiment, the probing device 108 may include a traffic analyzer 120 configured to analyze the monitored network communication and generate the set of metrics 122. In various embodiments, the set of metrics 122 may include information, such as, the latency added by the intranet 196 or the AP device 104, the performance of various servers 106, the availability of the server 106, the number of accesses or web pages requested from/provided by server 106, the number of errors, retransmissions, or otherwise failed network communication interactions (e.g., web page views, etc.) between the client device(s) 102 and the server 106, an overall quality value of the network communication (e.g., a synthetic or aggregated measurement of latency and errors, etc.), the bandwidth usage involving the server 104 or client 102, a determination of where in the network (e.g., the server 106, the AP device 104, the client 102, etc.) any errors occur, the number of times the server 106 is accessed (e.g., page views, etc.) in a given time period, the number of client devices 102 accessing the server 106 at any given time or time period, performance metrics by each of a plurality of servers 106 or intranets 196, etc. In various embodiments, these metrics may be compiled for the overall client/server communication, communications involving just one of the networks (e.g., server-to-AP device, client-to-AP device, etc.), or a combination thereof. It is understood that the above are merely a few illustrative examples to which the disclosed subject matter is not limited.

As described below, in various embodiments, the traffic analyzer 120 may be configured to match or correlate network communication from one side (e.g., client-side) of the internet 195/intranet 196 boundary with network communication from the other side (e.g., server-side) of the internet 195/intranet 196 boundary. As described below, this may include matching network communication from two tap points 107 and 107b (or additional tap points depending upon the embodiment) based upon a predetermined set of criteria. In various embodiments, the monitored or captured network communication from one side (e.g., the server-side) may be encrypted and the probing device 108 may not be able to decrypt that portion of the monitored network communication. In such an embodiment, the traffic analyzer 120 may still be configured to match or correlate, as best it can, the two portions (e.g., server-side and client-side) of the network communication.

In various embodiments, the probing device 108 may include a Metrics Generator 124 configured to generate a set of metrics 122 and, in some embodiments, the Metrics Generator 124 may also be configured to generate a set of timing (or other statistical) information 123 regarding the communications monitored by the probing device 108.

In one embodiment, the client-side probing device 108b may also include a Metrics Generator 124 (and other components similar to probing device 108, which are not explicitly shown due to space considerations). In such an embodiment, the client-side probing device 108b may not be configured to decrypt the encrypted network communications, but may be capable of generating or deriving timing information 123b based upon the encrypted network communications monitored via tap point 107b. Various techniques for generating such timing information 123b are described below in reference to FIGS. 4 and 5.

In some embodiments, both tap point analyzer devices 108 and 108b may be configured to generate timing information 123 and 123b for various portions of the network communication that are monitored by the particular probing device. In such an embodiment, a particular probing device (probing device 108b) may not be able to decrypt the encrypted network communication, and, therefore, may not be capable of generating as detailed metrics 122 or timing information 123 as are desired. In such an embodiment, the particular probing device (e.g., probing device 108b) may be configured to transmit these timing information 123b to the second or another probing device (e.g., probing device 108).

As described below in reference to FIG. 2, the second or receiving probing device (e.g., probing device 108) may be configured to decrypt the encrypted network communications it monitors. In such an embodiment, it or at least its traffic analyzer 120 may be configured to match or associate the received timing information 123b with the decrypted network communications it monitors or timing information 123 derived thereof. In such an embodiment, by combining the information provided by the received timing information 123 and 123b and the locally monitored network communications a more complete set of metrics 122 may be generated.

For example, a single data object or communication transaction may include a web page view having a request, fulfillment, and acknowledgment phases. That web page view communication may include two portions: a client-side portion between the client 102 and the AP device 104, and a server-side portion between the server 106 and the AP device 104. Both the client-side portion and the server-side portion may have their own respective performance metrics (e.g., latency, etc.). Because the web page view communication is split into two parts (client-side and server-side) it may not be possible to directly measure the, for example, latency or time from the start to the finish of the web page view communication as measured from the client 102 to the server 106. However, if the two sides or portions of the communication are matched, the client/server latency may be determined based upon the client/AP device latency (client-side latency) and the AP device/server latency (server-side latency), both of which may be measured directly. It is understood that the above is merely one illustrative example to which the disclosed subject matter is not limited.

Figure 2:
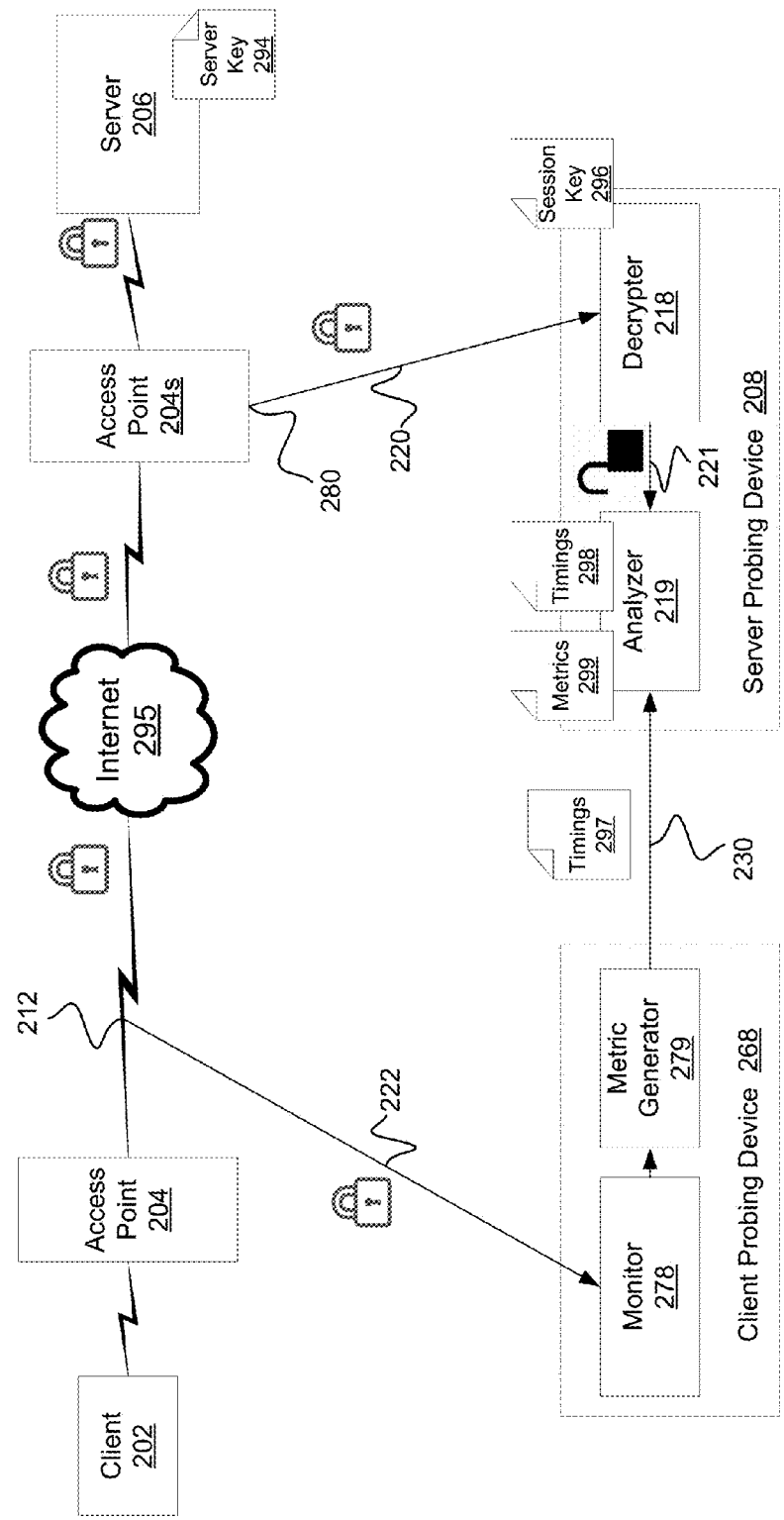
FIG. 2 is a block diagram of an example embodiment of a system in accordance with the disclosed subject matter.

FIG. 2 is a block diagram of an example embodiment of a system 200 in accordance with the disclosed subject matter. In various embodiments, the system 200 may include a client 202, a client-side AP device 204, an internet or second network 295, and a server 206 which is accessed across or via the second network 295. In various embodiments, the system 200 may include a server-side AP device 204s. The illustrated system 200 shows an embodiment in which the AP device 204 (AP device 204s) may not be a proxy but simply a router or other device. It is understood that the above is merely one illustrative example to which the disclosed subject matter is not limited.

In such an embodiment, a client-side tap point 212 may be placed near to, in a network topology sense, the server-side of the AP device 204. Likewise, in the illustrated embodiment, a server-side tap point 280 may be placed near to, in a network topology sense, to the server 206. In the illustrated embodiment, the network communication between the client 202 and the server 206 may occur in an encrypted or at least partially encrypted manner (illustrated via the closed lock graphic).

As described above, a plurality of tap or probe points may, in some embodiments, be added at various points throughout the system 200. In other embodiments, there may be tunneling proxies between the client 202 and server 206 which creates additional network segmentation. It is understood that the above is merely one illustrative example to which the disclosed subject matter is not limited.

In one embodiment, server infrastructure may use a load balancer, an SSL terminator or any kind of application delivery controller (ADC). In general, the server-side sniffer or tap point 280 may be installed in front of such device. Whenever the client infrastructure may use a gateway, proxy or other device, the tap point 212 may be away from the client 202, at the point facing the server 204. It is understood that the above are merely a few illustrative examples to which the disclosed subject matter is not limited.

In various embodiments, both the server-side tap point 280 and the client-side tap point 212 may be placed to see or monitor any encrypted network communication traffic between the client 202 and the server 206 (e.g., SSL or TLS traffic, etc.). As described below, in various embodiments, while both tap points 212 and 280 may be capable of monitoring or viewing the encrypted network communications, only one tap point 280 (or an associated device, such as, probing device 208, etc.) may be configured to decrypt the monitored encrypted network communication.

Further, in various embodiments, a number of other devices may exist within an intervening network (e.g., the internet 295). In such an embodiment, the network communications (e.g., packets, etc.) set by the server 206 to the client 202 may be sufficiently altered during transmission such that the any header timing or identification information included in the packets may be lost, rendered untrustworthy or more generally unusable for network monitoring purposes. In such an embodiment, the probing devices 268 and 208 may be configured to not rely upon information in the packet headers that may be changed by an intervening device.

In one embodiment, the system 200 may include a server-side network probing device 208 and a client-side network probing device 268. In such an embodiment, the network probing device 268 may be configured to receive a copy of the network communication 222 captured or duplicated by the network tap point 212. Likewise, network probing device 208 may be configured to receive a copy of the network communication 220 captured or duplicated by the network tap point 280.

In various embodiments, the network probing device 268 may not be capable of decrypting the network communication 220. Regardless, the network probing device 268 may be configured to monitor the encrypted network communication 222 and not discard or ignore the encrypted network communication or data objects. However, as described below, in various embodiments, portions of the encrypted network communication or data objects may not be analyzed or ignored for analytical purposes.

In this context, a "data object" includes a discrete portion of a network communication and may include a data packet, datagram, or frame, and may be measured in terms of bytes, bits, or characters. Used herein the term "packet" may be used as a specific example embodiment of a type of data object.

In various embodiments, the data object may include a header portion and a payload portion. In such an embodiment, the header portion may, at a minimum, indicate the immediate source and destination devices to which the data object is transmitted from/to, respectively (e.g., client device 202 and AP device 204, AP device 204 and server 206, etc.). The payload portion may include any information transmitted by the data object and may also include encapsulated routing or header information (e.g., in the case where the network communication is interrupted by or involves a proxy server, a virtual local area network information, a virtual private network information, etc.). In some embodiments, this payload portion may be encrypted. In various embodiments, network communication may include a stream or plurality of various data objects transmitting respective pieces of information between two devices (e.g., client 202 and server 206, etc.).

In various embodiments, in which the encrypted network communication is monitored, the client probing device 268 may be configured to provide limited network performance metrics (e.g., latency, etc., as described above, etc.) based on the network portion between the tap point 212 and the server 206. In such an embodiment, the probing device 268 may be configured to provide limited metrics or network performance statistics.

In various embodiments, a server-side tap point 280 may be employed. In such an embodiment, the system 200 may include a server probing device 208. The server probing device 208 may be configured to monitor the encrypted network communication 220 and not discard or ignore the encrypted network communication or data objects.

Unlike the client probing device 268, the server probing device 208 may be more tightly integrated with or more trusted. In such an embodiment, the server 206 may provide the server probing device 208 with the server's private keys or security credentials 295. In such an embodiment, the server probing device 208 may, as part of monitoring the network communication 220, detect when a new encrypted network communication session is starting (e.g., the SSL negotiation phase of the SSL session, etc.), and extract (using the server key 294) the session encryption key or session security credentials 296 for each encrypted network communication session. In various embodiments, this may allow the server probing device 208 to decrypt the monitored server-side network communication 220.

In such an embodiment, the encrypted server-side network communication 220 maybe decrypted (e.g., via a decrypter 218 portion of the probing device 208, and indicated in the illustration by the open lock graphic). In various embodiments, a traffic monitor portion (shown in FIG. 1) of the probing device 208 may include the decrypter 218.

In the illustrated embodiment, the analyzer 219 may be configured to provide a greater analysis and more accurate metrics than that of client probing device 268 which is incapable to decrypting encrypted network communication. In such an embodiment, the analyzer 219 may be configured to correlate or match data objects or portions from the decrypted server-side network communication with data objects or portions from the encrypted client-side network communications. In various embodiments, various metrics may be provided based upon these matched data objects that include metrics for the client 202/server 206 network communication as a whole, as well as metrics for each side or portion (client-side, server-side) of the network communication.

As described above, the client probing device 268 may not be capable to decrypting the encrypted monitored network communication traffic 222. In such an embodiment, the information included by the monitored network communication traffic 222 that would normally be analyzed (e.g., Uniform Resource Identifiers (URIs), Uniform Resource Locators (URLs), cookies, etc.) may be unavailable for the portions of the monitored traffic 222 that are encrypted. However, the client probing device 268 may be configured to view or examine portions of HTTPS transactions or other definable portions of the encrypted monitored network communication traffic 222 (e.g., the being or end of an SSL Record, as described below, etc.). In various embodiments, other information may also be viewed or examined, such as, for example, TCP/IP level information or timing metrics, etc. It is understood that the use of HTTP is merely an illustrative example to which the disclosed subject matter is not limited.

In various embodiments, the client probing device 268 may include a monitor 278 configured to monitor or record the monitored network traffic 222. In one embodiment, the client probing device 268 may include a Metric Generator 279 configured to generate a various metrics (e.g., timing information 297) for portions of the monitored network traffic 222. In the illustrated embodiment, the metrics generator 279 generated timing information 297; however, it is understood that timing is merely an illustrative examples to which the disclosed subject matter is not limited.

In various embodiments, this timing information 297 may be transmitted or sent from the client probing device 268 to the server probing device 208. In various embodiments, the other derived or monitored transactions or metrics may be transmitted or sent to the server probing device 208.

In some embodiments, the Metrics Generator 279 may be configured to examine the unencrypted portions (e.g., headers, etc.) of the monitored network traffic 222. As described above, the payload portions may be encrypted and unreadable by the client probing device 268. For each packet, data unit, data object or otherwise discrete portion of the network traffic 222, the client probing device 268 may detect which direction (e.g., client-to-server, server-to-client, etc.) the packet is directed. In various embodiments, this may be done based upon the un-encrypted header.

It is understood that the description and use of HTTP an HTTPS is merely one illustrative example to which the disclosed subject matter is not limited. In various embodiments, other encrypted protocols and communications schemes may be employed. For example, such protocols may include Simple Mail Transfer Protocol (SMTP), SSH File Transfer Protocol (SFTP), etc. It is understood that the above are merely a few illustrative examples to which the disclosed subject matter is not limited.

In the illustrated embodiment, packets or data objects and their associated metrics may be matched between the client-side and the server-side using timing information 297 and 298. In some embodiments, this timing information may be derived from timestamps placed on or included by the data objects or packets. In another embodiment, as described below, the timestamps may be included with a series of data objects or packets.

In this context, a "data communications session" may include a series of data objects or packets grouped together via a communications protocol. In one embodiment, a data communications session may include an SSL/TLS record which defines a number of data objects or packets as belonging to the SSL/TLS record and has a definable start point and end point. In such an embodiment, an SSL/TLS Record establishes a set of encryption credentials for a series of data objects or packets. In various embodiments, an SSL/TLS session may include a plurality of SSL/TLS Records. It is understood that the above are merely a few illustrative examples to which the disclosed subject matter is not limited.

In one embodiment, timing information 297 may be recorded or determined (e.g., via timestamps, etc.) by the client probing device 268 for all data objects or packets. In another embodiment, the client probing device 268 may only generate timing information 297 to particular portions of the monitored communications or for certain types of data objects or packets. For example, in one embodiment, the client probing device 268 may be configured to ignore or not determine timing information 297 for certain packets types (e.g., Acknowledgment (ACK) packets, intermediate SSL/TLS negotiation packets, etc.) which are deemed (e.g., via predetermined settings, etc.) to not be useful or desirable for measuring latencies or other metric information. In another embodiment, only some portions of a data communications session may be analyzed.

For example, the SSL/TLS end time may be detectable since it is generally carried over unencrypted payloads. The intermediate SSL negotiation packets are not interesting and may not be monitored. Conversely, the final SSL/TLS negotiation ACK packet timing may be analyzed, in order to measure the SSL/TLS time, perceived on the client-side. In such an embodiment, SSL/TLS negotiation messages such as SSL/TLS server HELLO, certificate transfers, key exchanges, etc. may not be analyzed or included in the timing information 297. In another embodiment, the encrypted communication may include large data accesses such as rows or fields from a database. In such an embodiment, some of the rows may not be deemed to be interesting and may be ignored or not monitored. In yet other embodiments, portions of the encrypted communications may be ignored or not monitored based upon the protocol or form of the communication. It is understood that the above are merely a few illustrative examples to which the disclosed subject matter is not limited.

In various embodiments, once the client probing device 268 has determined a number of metrics based upon or derived from the encrypted communications 222 this timing information 297 (or other monitored metric information) may be transmitted to the server probing device 208. It is understood that the above is merely one illustrative example to which the disclosed subject matter is not limited.

In various embodiments, the analyzer 219 may include an metric generator that is used or employed to generate a second set of metric information (e.g., timing information 298, etc.) that are based upon the decrypted network communications 221. These decrypt-based timing information 298 may then be compared to the encryption-based timing information 297 to correlate or associate portions or transactions within the network communications. In various embodiments, if a decrypt-based substantially timing information portion and an encryption-based timing information portion match, the analyzer 219 may determine that the underlying portion of the network communications match as for a given portion of the network communications. The analyzer 219 may be configured to generate a set of metrics 299 based upon the information available in the decrypted network communications 221 (e.g., packet headers, cleartext views of request/response messages, etc.) and the client probing device 268 provided timing information 297. It is understood that the above is merely one illustrative example to which the disclosed subject matter is not limited.

In one embodiment, the information 221 that goes from the decrypting device 218 or 318 to the analyzer 219 may not simply be the decrypted communication payload. In such an embodiment, the information 221 may include an event's model (for efficiency reasons) and binding material.

In this context, the term "event model" may include summary information (e.g., in the HTTP case: URI, start and end time, some particular header, byte size, etc.) but not the whole cleartext payload. In one embodiment, the model may include or be represented as a comma-separated values (CSV) files, or database tables. In various embodiments, the event model may include an essential reduction of the information entropy of the actual cleartext message.

In this context, the event's "binding material" may include the event's

SSL/TLS session matching material (e.g., the client/ server hello random numbers, etc.) and the packet or bytes or SSL/TLS record number s "of interest"(depending on the technique used). It is understood that the above is merely one illustrative example to which the disclosed subject matter is not limited.

In such an embodiment, the binding material and/or event model may be used by the analyzer 219 to pair or match the remotely observed timings 297 with the locally observed event or (in one embodiment) timings 298 and to assign (bind)) the remote timings to the equivalent points of interest on this event.

In various embodiments, the analyzer 219 may also opportunistically generate or transfer) other metrics 299. For example, in one embodiment TCP related metrics may include round-trip time (RTT), out-of-order (OOO) count, retransmits, packets count, etc. In various embodiments, the metrics 299 may also include encrypted-envelopes-related metrics (e.g., SSL/TLS negotiation details, etc.) based on the event's model.

In various embodiments, that the decrypter 218 may be required to contribute the "binding material", because the decrypter 218 may provide the only or the least difficult opportunity to perform such observations on the encrypted communications and provide those operations in relation to the event model. It is understood that the above is merely one illustrative example to which the disclosed subject matter is not limited.

In various embodiments, the analyzer 219 may be configured to determine that two data objects (e.g., an encrypted network traffic portion and a decrypted network traffic portion, etc.) are matched or correlated if a set of predefined criteria are met. It is understood that the below are merely a few illustrative example criteria to which the disclosed subject matter is not limited.

Figure 3:
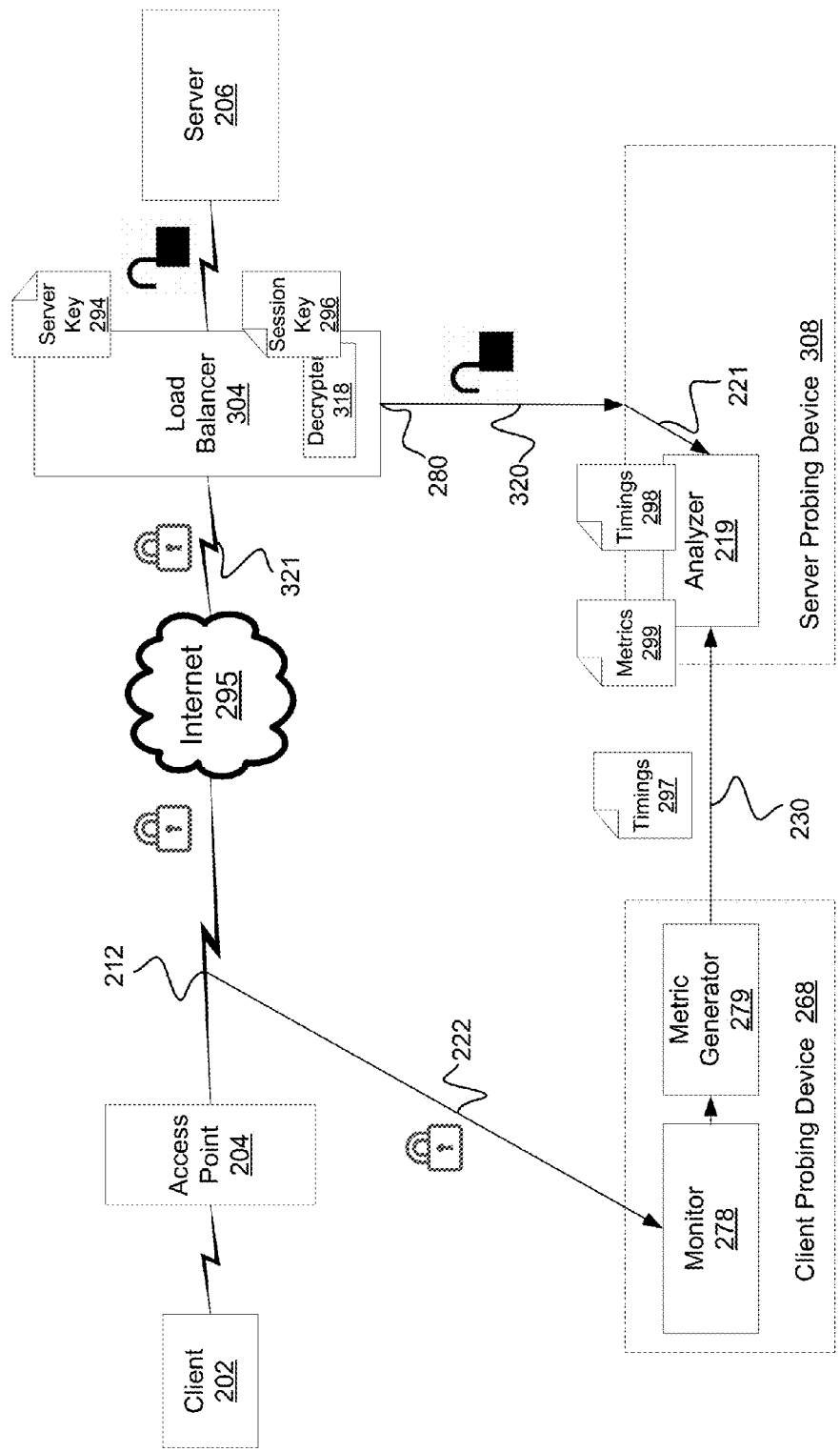
FIG. 3 is a block diagram of an example embodiment of a system in accordance with the disclosed subject matter.

FIG. 3 is a block diagram of an example embodiment of a system 300 in accordance with the disclosed subject matter. System 300 may include a variation of or a similar system to system 200 of FIG. 2.

In the illustrated embodiment, the system 300 may include a load balancer 304 instead of the access point 204s of FIG. 2. While a load balancer is shown, it is understood that the above is merely one illustrative example to which the disclosed subject matter is not limited and other devices may used.

In the illustrated embodiment, the load balancer 304 may include a decrypter 318 configured to decrypt/encrypt the encrypted network communications between the server 206 and client 202. In various embodiments, the decrypter 318 may be configured to make use of or employ the session key 296 as part of the decryption process.

In such an embodiment, the server probing device 308 may not include a decrypter 218, unlike server probing device 208 of FIG. 2. In such an embodiment, the tap point 280 may provide a decrypted version 320 of the encrypted network communications 321. In such an embodiment, the decrypted network communications 320 may be the same as or substantially equivalent to the (e.g., allowing for buffering or ancillary processing by the server probing device 308, etc.) decrypted network communications 221. In various embodiments, network communications 320 may include the event model and binding material, as described above in relation to the decrypted communications 221 of FIG. 2. It is understood that the above is merely one illustrative example to which the disclosed subject matter is not limited.

It is understood that while embodiments showing a server-side probe doing the decryption has been shown in FIGS. 1, 2, and 3. the disclosed subject matter is not limited to that embodiment. It is understood that the above is merely one illustrative example to which the disclosed subject matter is not limited.

In a preferred embodiment, the non-decrypting probe may be configured to send data to the decrypting probe. In various embodiments, this may have advantages related to security reasons and also for a SaaS topology. For example, it may not be desired to bring all other SaaS tenants to a single SaaS tenant location. It is understood that the above are merely a few illustrative examples to which the disclosed subject matter is not limited.

In one embodiment, in a closed system where the encrypted communication(s) are monitored without preferable vantage points (e.g., encrypted communications inside a virtual private network (VPN) bridge in a company), it is conceivable that either probes all send their timings to a third (or other) analyzing entity that is not probing at all and not even in proximity to either probes. It is understood that the above is merely one illustrative example to which the disclosed subject matter is not limited.

In various embodiments, network equipment manufacturers may want to disclose such encrypted envelope timings like a building block of performance monitoring tools. In such an embodiment, routers, load-balancers, webservers, VPN access points, or other networking devices, etc. may be configured to produce the encryption envelope (e.g., SSL/ TLS, etc.) timings. In such an embodiment, a decrypting probe may be configured to enrich its data model with those vantage points (e.g., the timing information, etc.).

In one embodiment, the server probing device 308 may include the analyzer 219. In various embodiments, the analyzer 219 may be configured to match the decrypted network communications 221 to the timing information 297, as described above. In such an embodiment, the analyzer 219 may be configured to generate the metrics 299 based upon the information available from the monitored decrypted network communications 221 and the timing information 297 provided by the client probing device 268.

Figure 4:
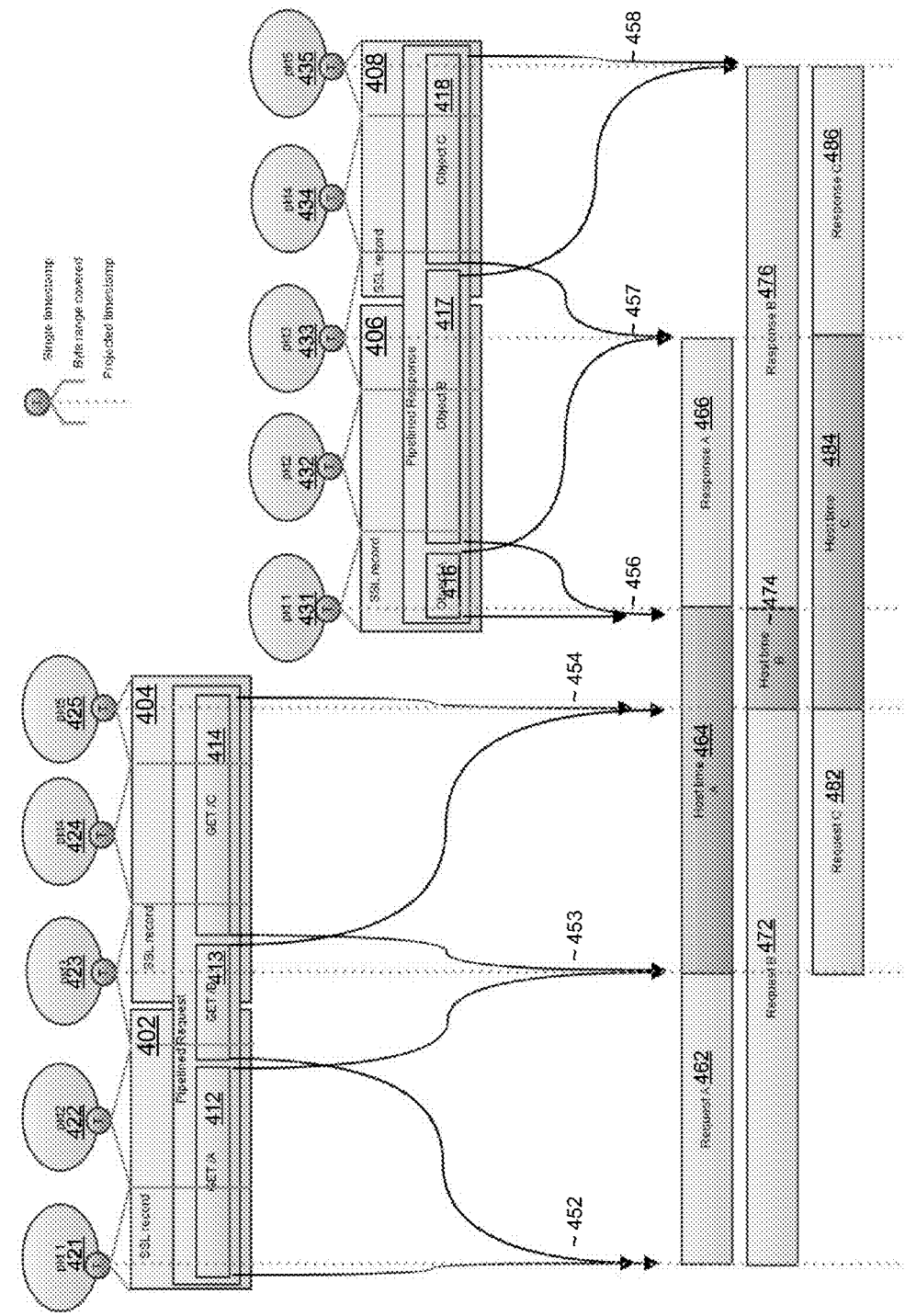
FIG. 4 is a timing diagram of an example embodiment of a system in accordance with the disclosed subject matter.

FIG. 4 is a timing diagram of an example embodiment of a system in accordance with the disclosed subject matter. As described above, in various embodiments, the intervening devices may alter or change the data objects or packets between the time they are transmitted from the server and received by the client (or vice versa). In such an embodiment, the timestamps of a data object or packet may not be available or may have been changed. In such an embodiment, an alternative, possible unencrypted identifier may be employed. In the illustrated embodiment, information from an SSL record may be employed to identify various data transfers. It is understood that the above is merely one illustrative example to which the disclosed subject matter is not limited.

In the illustrated embodiment, 3 data transfers A, B and C are shown. In the illustrated embodiment, each data transfer includes a request message (e.g., Get A 412 for data transfer A, etc.) and a response message (e.g., Object A 416 for data transfer A, etc.). In various embodiments, these data transfers may occur substantially concurrently or in a pipelined fashion, such that data transfer B begins before data transfer A completes. It is understood that the above is merely one illustrative example to which the disclosed subject matter is not limited.

In one embodiment, the request messages 412, 413, and 414 may be transmitted via packets 421, 422, 423, 424, and 425. Likewise, the response messages 416, 417, and 418 may be transmitted via packets 431, 432, 433, 434, and 435. In the illustrated embodiment, the start and end of the packets is illustrated by lines connecting the packets to the SSL Records. In the illustrated embodiment, each packet 421, etc. is associated with or includes a timestamp 452, etc. In such an embodiment, of the packets (e.g., packets 421, 422, and 423, etc.) required to form an SSL record (e.g., SSL Record 402, etc.), the earliest packet time (e.g., time 452, etc.) may become the SSL record 402 start time while the latest packet time (e.g., time 453, etc.) may become the SSL record 402's end time.

These various data objects or packets may be encrypted via encryption envelopes 402, 404, 406, and/or 408. In the illustrated embodiment, the encryption envelopes 402, 404, 406, and 408 are shown as SSL Records. It is understood that the above is merely one illustrative example to which the disclosed subject matter is not limited.

In various embodiments, even the decrypt-incapable probing device may be capable of determining the start and end of each SSL record. As such, by examining the start or end of the SSL Records the decrypt-incapable probing device may be capable of estimating or deriving timing information regarding the request/response messages.

Conversely, in one embodiment, the decrypt-incapable probing device may not be capable of determining when a request (e.g., Get A 412, etc.) or response (Object A 416, etc.) occur. However, the decrypt-capable probing device may be able to discern this information or at least which request/response was encapsulated or included by which encryption envelope. For example, decrypt-capable probing device may be able to determine that the Get A 412 message is encapsulated or included by the SSL Record 402. In such an embodiment, the decrypt-capable probing device may be able to determine this because it may decrypt the SSL Record 402 and view the contents within, whereas the decrypt-incapable probing device may not be able to do this.

In various embodiments, the decrypt-capable probing device may be configured to receive the timing information (e.g., start time, end time, etc.) of the various SSL Records 402, 404, 406, and 408 from the decrypt-incapable probing device. In one embodiment, the decrypt-capable probing device may be configured to use that timing information in addition to what the decrypt-capable probing device knows or is able to determine are the contents of the SSL Records 402, 404, 406, and 408 to estimate or determine when the various request/response messages occurred.

In the illustrated embodiment, the decrypt-capable probing device may recognize that the SSL record 402 includes the request A message 412 and, via the timing information provided by the decrypt-incapable probing device, that the SSL record 402 starts at time 452. The decrypt-incapable probing device may recognize that packet 422 includes neither an end or start of an SSL record, but that packet 423 includes the end of SSL record 402 at time 453, and therefore no timing information may be generated based upon packet 422. But, timing information may be generated based upon the end of SSL Record 402 at time 453. Therefore, the decrypt-capable probing device may infer or estimate that the request A message 412 occurs during time period 462, between times 452 and 453.

In the illustrated embodiment, the decrypt-capable probing device may recognize that the SSL record 406 includes the response A message 416 and, via the timing information, that the SSL record 406 starts at time 456. The decrypt-incapable probing device may recognize that packet 432 includes neither an end or start of an SSL record (and therefore no timing information may be generated), but that packet 433 includes the end of SSL record 406 at time 457. Therefore, the decrypt-capable probing device may infer or estimate that the response A message 416 occurs during time period 466 (the time between times 456 and 457), and the server or host took the time period 464 (between times 453 and 456) to process the request A 412.

Likewise, the decrypt-capable probing device may recognize that the SSL record 402 includes the beginning of request B message 413 and, via the time information supplied by the decrypt-incapable probing device, that the SSL record 402 starts at time 452. The decrypt-incapable probing device may recognize that the SSL record 404 includes the ending of request B message 413 and, via the timing information, that the SSL record 404 ends at time 454. The decrypt-capable probing device may recognize that the SSL record 406 includes the beginning of response B message 417 and, via the timing information, that the SSL record 406 starts at time 456. The decrypt-capable probing device may recognize that the SSL record 408 includes the ending of response B message 417 and, via the timing information, that the SSL record 408 ends at time 458. Therefore, the decrypt-capable probing device may infer or estimate that the request B message 413 occurs during time period 472. The decrypt-capable probing device may infer or estimate that the response B message 417 occurs during time period 476. Therefore, the server or host took the time period 474 (between times 454 and 456) to process the request B 413.

Likewise, the decrypt-capable probing device may recognize that the SSL record 404 includes the request C message 414 and, via the timing information, that the SSL record 404 starts at time 453 and ends at time 454. The decrypt-capable probing device may recognize that the SSL record 408 includes the response B message 418 and, via the timing information, that the SSL record 408 starts at time 457 and ends at time 458. Therefore, the decrypt-capable probing device may infer or estimate that the request C message 414 occurs during time period 482. The decrypt-capable probing device may infer or estimate that the response C message 418 occurs during time period 486. Therefore, the server or host took the time period 484 (between times 454 and 457) to process the request C 414.

In various embodiments, the decrypt-incapable probing device may be configured to transmit timing information regarding the SSL Records, instead of the packets to the decrypt-capable probing device. In such an embodiment, the decrypt-capable probing device may be configured to associate these SSL Record timings with various request/response messages.

In various embodiments, the timing information messages sent to the decrypt-capable probing device may include a SSL record identifier that indicates which SSL Record is associated with a particular request or response message. It is understood that the above is merely one illustrative example to which the disclosed subject matter is not limited.

In various embodiments, the encrypted communication envelope (e.g., SSL Record, etc.) may not, depending upon the communications protocol employed, include an identifier or numbering scheme. In such an embodiment, an identifier or number may be assigned by the probing devices to each of the encrypted communication envelope (e.g., SSL Record, etc.). In one embodiment, this numbering may be sequential; although, it is understood that the above is merely one illustrative example to which the disclosed subject matter is not limited.

FIG. 5 is a timing diagram of an example embodiment of a system in accordance with the disclosed subject matter. In another embodiment, the encrypted communication sessions may have a known (e.g., 1-to-1, etc.) relationship to the un-communication. encrypted For example, each byte of un-encrypted data may request in one byte of encrypted data. In such an embodiment, the decrypt-incapable probing device may be configured to transmit or determine timing information based upon the bytes of the encrypted communication.

In various embodiments, the encryption or transmission protocol may add additional bytes or padding data to the encrypted communication session that do not exist in the plaintext or un-encrypted communication. However, the amount or size of the additional bytes are generally known and hence can be accounted for. For example, the payload of an SSL Record may be 5 bytes off from the plaintext payload because of the SSL record header. It is understood that the above is merely one illustrative example to which the disclosed subject matter is not limited.

In one embodiment, the decrypt-incapable probing device may receive a list or series of bytes (or other measure, e.g., kilobytes, etc.) for which the timing information is desired. In one embodiment, this list of bytes may be received from the decrypt-capable probing device. Based upon this list the decrypt-incapable probing device may monitor the encrypted communications session and derive timing information by counting the bytes in the encrypted communications session and recording the time when the bytes of interest where received/sent.

For example, in one embodiment, the encrypted communications session 502 may be broken into and transmitted as a series of data objects or packets 504. In the illustrated embodiment, the series of packets 504 may include packets 521, 522, 523, 524, and 525.

The encrypted communications session 502 may also include an unencrypted header portion 512 (which the decrypt-incapable probing device may read the contents of) and an encrypted payload portion 514 (which decrypt-incapable probing device may not read the contents of). In various embodiments, the encrypted communications session 502 may also include a footer portion 516.

In one embodiment, the decrypt-incapable probing device may receive the packet 521 which starts at byte 530 of the encrypted communications session 502 and ends at byte 532. In such an embodiment, the decrypt-incapable probing device may count the size or number of bytes of the header 512 and determine that the offset 531 of the encrypted communications session 502 from the list or series of bytes for which the timing information is desired.

In various embodiments, as each packet (e.g., packet 522, etc.) arrives the number of bytes of the packet 522 (byte 532 to byte 534) may be added to a count of bytes within the encrypted communications session 502. This byte count may be compared to the list of bytes for which the timing information is desired.

If the packet 522 includes one of the bytes for which the timing information is desired, the timing information of packet 522 may be recorded. In one embodiment, the arrival time of the packet 522 may be recorded and eventually transmitted to decrypt-capable probing device as timing information, as described above.

In one embodiment, the timing information may include time information for each of the bytes within the list of bytes for which the timing information is desired.

In another embodiment, the timing information may include time information not for the specific bytes within the list, but instead the time information for the packets that include the bytes for which the timing information is desired. In yet another embodiment, the timing information may include time information for the beginning or ending bytes (e.g., bytes 530, 532, 534, 536, 538, or 539) or a byte range for the packets that include the bytes for which the timing information is desired.

In various embodiments, un-encrypted, plaintext, or cleartext data may be compressed prior to encryption and eventual transmission as the encrypted network communications. In such an embodiment, the 1-to-1 byte relationship between the encrypted and decrypted network communications, described above, may not exist. This may complicate the timing analysis, as an encrypted payload 514 may not be decrypted and decompressed by the decrypt-incapable probing device. In such an embodiment, the decrypt-capable probing device may generate the list of bytes for which the timing information is desired based upon the compressed data and not the uncompressed data. In such an embodiment, the list of bytes for which the timing information is desired may be based on the bytes within the encrypted payload 514 and not on the un-encrypted or plaintext data, as described above. In some embodiments, the list of bytes may be approximate as the decrypt-capable probing device may not be able to accurately measure the bytes in between the compression and encryption steps or transmission. It is understood that the above is merely one illustrative example to which the disclosed subject matter is not limited.

FIG. 6 is a flow chart of an example embodiment of a technique in accordance with the disclosed subject matter. In various embodiments, the technique 600 may be used or produced by the systems such as those of FIGS. 1, 2, or 3. Furthermore, portions of technique 600 may be used to produce data objects such as those of that of FIGS. 4, or 5. Although, it is understood that the above are merely a few illustrative examples to which the disclosed subject matter is not limited. It is understood that the disclosed subject matter is not limited to the ordering of or number of actions illustrated by technique 600.

Block 602 illustrates that, in one embodiment, encrypted communications session between a first computing device and a second computing device may be monitored, as described above. In various embodiments, each encrypted communications session may include transmitting a plurality of encrypted data objects between the first and second computing devices, as described above. In various embodiments, one or more of the action(s) illustrated by this Block may be performed by the apparatuses or systems of FIGS. 1, 2, or 3, the client-side tap points of FIGS. 1, 2, or 3, as described above.

Block 604 illustrates that, in one embodiment, timing information regarding an encrypted communications session may be derived, as described above. In one embodiment, deriving may be based upon one or more received encrypted data objects included by the encrypted communications session, as described above. In some embodiments, deriving may include determining a start of an encryption envelope included by the monitored encryption communications session, and determining an end of the encryption envelope, as described above.

In another embodiment, deriving may include receiving an indication, from the second probing device, of a location within an encrypted communication session for which timing information is to be derived, as described above. In such an embodiment, deriving may further include determining when the indicated location within an encrypted communication session has been received by the second probing device, as described above. In various embodiments, deriving may also include storing a timestamp associated with the received indicated location within an encrypted communication session, as described above.

In some embodiments, the location within the encrypted communications session may be indicated via a byte offset from the start of a portion of the encrypted communications session, as described above. In such an embodiment, determining when the indicated location within an encrypted communication session has been received may include, for each received encrypted data object, determining if the received encrypted data object is included with the indicated encrypted communications session, determining the byte range within the indicated encrypted communications session associated with the received encrypted data object, and comparing the byte range associated with the received encrypted data object to the indicated byte offset., as described above.

In some embodiments, the encrypted communications session may include data objects that are both compressed and encrypted. In such an embodiment, deriving may include receiving an indication, by the first probing device and from the second probing device, of a location within an encrypted communication session for which timing information is to be derived, wherein the location is based upon the compressed and encrypted data objects, as described above.

In some embodiments, the encryption communication session includes one or more encryption envelopes, as described above. In such an embodiment, deriving may include basing the timing information on a timestamp associated with the encrypted envelopes, as described above. In another embodiment, deriving may include ignoring, for purposes of deriving the timing information, one or more received encrypted data objects included by the encrypted communications session that are indicated, by the first computing device, as ignorable, as described above. In various embodiments, one or more of the action(s) illustrated by this Block may be performed by the apparatuses or systems of FIGS. 1, 2, or 3, the client-side tap points of FIGS. 1, 2, or 3, as described above.

Block 606 illustrates that, in one embodiment, the derived timing information may be transmitted to another device, as described above. In one embodiment, the timing information may be transmitted to a server-side probing device, as described above. In various embodiments, one or more of the action(s) illustrated by this Block may be performed by the apparatuses or systems of FIGS. 1, 2, or 3, the client-side tap points of FIGS. 1, 2, or 3, as described above.

Block 608 illustrates that, in one embodiment, at least a portion of the encrypted communication session may be decrypted by a second probing device, as described above. In various embodiments, one or more of the action(s) illustrated by this Block may be performed by the apparatuses or systems of FIGS. 1, 2, or 3, the server-side tap points of FIGS. 1, 2, or 3, as described above.

Block 610 illustrates that, in one embodiment, a set of metrics related to the encrypted communications session may be created. In various embodiments, these metrics may be based upon the decrypted portion of the encrypted communication session and the derived timing information, as described above. In some embodiments, creating may include correlating a start of the data message with derived timing information, provided by the first probing device, indicating the timing of a start the encryption envelope, and correlating an end of the data message with derived timing information, provided by the first probing device, indicating the timing of an end the encryption envelope, as described above. In various embodiments, one or more of the action(s) illustrated by this Block may be performed by the apparatuses or systems of FIGS. 1, 2, or 3, the server-side tap points of FIGS. 1, 2, or 3, as described above.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system for generating end-to-end performance metrics in a network, the system comprising:
   a server-side probing device disposed on a server-side network, the server-side probing device configured to:
      monitor a network communication on the server-side network, the network communication on the server-side network being encrypted;
      decrypt the network communication on the server-side network using an encryption key;
      obtain first performance metrics based on the decrypted network communication on the server-side network;
   a client-side probing device disposed on a client-side network, the client-side probing device configured to:
      monitor a network communication on the client-side network, the network communication on the client-side network being encrypted;
      obtain second performance metrics regarding the network communication monitored on the client-side network without the client-side probing device decrypting the network communication on the client-side network;
      send the network communication on the client-side network and the second performance metrics to the server-side probing device,
   wherein the server-side probing device is configured to match the network communication on the server-side network and the network communication on the client-side network based on one or more network level attributes of each of the network communication on the server-side network and the network communication on the client-side network,
   wherein the server-side probing device is configured to provide performance metrics based on the first and second performance metrics.

2. The system of claim 1, wherein the performance metrics include client-side latency and server-side latency.

3. The system of claim 1, wherein the performance metrics include error rates.

4. The system of claim 1, wherein the performance metrics includes page load times.

5. The system of claim 1, wherein the performance metrics includes an aggregated measurement of latency and errors.

6. The system of claim 1, further comprising a load balancer.

7. The system of claim 1, wherein the server-side network is the Internet, and the client-side network is an Intranet.

8. The system of claim 1, wherein the one or more network level attributes includes at least one of a client internet protocol (IP) number, a client transmission control protocol (TCP) port number, and a TCP sequence number.

9. The system of claim 1, wherein the performance metrics are end-to-end performance metrics.

10. A method of generating end-to-end performance metrics within a system having a server device that provides an application as a service over a network to a client computing device, the method comprising:
    monitoring, by a server-side probing device, a network communication on a server-side network, the network communication on the server-side being encrypted;
    decrypting, by the server-side probing device, the network communication on the server-side network using an encryption key;
    obtaining, by the server-side probing device, first performance metrics based on the decrypted network communication on the server-side network;
    monitoring, by a client-side probing device, a network communication on a client-side network, the network communication on the client-side network being encrypted;
    obtaining, by the client-side probing device, second performance metrics regarding the network communication on the client-side network;
    sending, by the client-side probing device, the network communication on the client-side network and the second performance metrics to the server-side probing device;
    matching the network communication on the server-side network and the network communication on the client-side network based on one or more network level attributes of each of the network communication on the server-side and the network communication on the client-side network; and
    generating performance metrics based on the first and second performance metrics.

11. The method of claim 10, wherein the performance metrics include client-side latency and server-side latency.

12. The method of claim 10, wherein the performance metrics include error rates.

13. The method of claim 10, wherein the performance metrics include page load times.

14. The method of claim 10, wherein the second performance metrics are obtained without the client-side probing device decrypting the network communication on the client-side network.

15. A non-transitory computer-readable medium including executable code that, when executed by at least one processor, is configured to cause a computer system to:
- monitor, at a server-side probing device, a network communication on a server-side network, the network communication on the server-side network being encrypted;
- decrypt the network communication on the server-side network using an encryption key;
- obtain, by the server-side probing device, first performance metrics based on the decrypted network communication on the server-side network;
- monitor, by a client-side probing device, a network communication on a client-side network, the network communication on the client-side network being encrypted;
- obtain, by the client-side probing device, second performance metrics regarding the network communication on the client-side network;
- send, by the client-side probing device, the network communication on the client-side network and the second performance metrics to the server-side probing device; and
- provide performance metrics based on the first and second performance metrics.

16. The non-transitory computer-readable medium of claim 15, wherein the performance metrics include client-side latency and server-side latency.

17. The non-transitory computer-readable medium of claim 15, wherein the performance metrics include error rates.

18. The non-transitory computer-readable medium of claim 15, wherein the performance metrics includes page load times.

19. The non-transitory computer-readable medium of claim 15, wherein the performance metrics include an aggregated measurement of latency and errors.

20. The non-transitory computer-readable medium of claim 15, wherein the second performance metrics are obtained without the client-side probing device decrypting the network communication on the client-side network.

* * * * *